(12) United States Patent
Chen (10) Patent No.: US 12,389,098 B2
(45) Date of Patent: Aug. 12, 2025

(54) CAMERA MODULE AND ELECTRONIC DEVICE

(71) Applicant: AAC Optics (Nanning) Co., Ltd., Guangxi (CN)

(72) Inventor: Hongbin Chen, Nanning (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 128 days.

(21) Appl. No.: 18/544,519

(22) Filed: Dec. 19, 2023

(65) Prior Publication Data

US 2024/0340513 A1  Oct. 10, 2024

Related U.S. Application Data

(63) Continuation of application No. PCT/CN2023/087357, filed on Apr. 10, 2023.

(51) Int. Cl.
*H04N 23/54* (2023.01)
*G03B 17/12* (2021.01)
*H04N 23/55* (2023.01)

(52) U.S. Cl.
CPC ............ *H04N 23/54* (2023.01); *G03B 17/12* (2013.01); *H04N 23/55* (2023.01)

(58) Field of Classification Search
CPC ........ H04N 23/54; H04N 23/55; H04N 23/57; G03B 17/12
See application file for complete search history.

(56) References Cited

U.S. PATENT DOCUMENTS

| | | | | |
|---|---|---|---|---|
| 11,785,325 B2* | 10/2023 | Wang | ............ | H04N 23/54 |
| | | | | 348/374 |
| 2018/0035029 A1* | 2/2018 | Wang | ............ | H05K 1/181 |
| 2018/0095204 A1* | 4/2018 | Lin | ............ | G02B 5/003 |
| 2021/0127040 A1* | 4/2021 | Wang | ............ | H04N 23/55 |
| 2021/0266436 A1* | 8/2021 | Wang | ............ | H05K 1/0216 |
| 2022/0232150 A1* | 7/2022 | Song | ............ | H04N 23/55 |
| 2024/0074063 A1* | 2/2024 | Lai | ............ | H10F 39/806 |

* cited by examiner

*Primary Examiner* — Padma Haliyur
(74) *Attorney, Agent, or Firm* — Wiersch Law Group (57) ABSTRACT

The present disclosure discloses a camera module and an electronic device. The camera module includes a circuit board including a board body and at least one ring-shaped protruding portion that is protruded and extended from a part of a side of the board body; a photosensitive chip fixed on the board body and electrically connected with the board body; an optical filter fixed on a side of the at least one protruding portion away from the board body; at least one capacitor fixed on the side of the board body close to the optical filter and electrically connected with the board body; a base defining a mounting space penetrating through the base; and a lens mounted in the mounting space and spaced apart from a side of the optical filter. The camera module of the present disclosure reduces the overall design size and meets the ultra-miniaturization design requirements.

16 Claims, 6 Drawing Sheets

CAMERA MODULE AND ELECTRONIC DEVICE

CROSS REFERENCE TO RELATED APPLICATIONS

The present application is a continuation of PCT Patent Application No. PCT/CN2023/087357, filed Apr. 10, 2023, which is incorporated by reference herein in its entirety.

TECHNICAL FIELD

The various embodiments described in this document relate in general to the field of camera technologies, and more specifically to a camera module and an electronic device.

BACKGROUND

Cameras have been widely used in the field of intelligent devices due to their mature functions and processes. With the rapid development of the intelligent devices, devices with camera functions such as mobile phones, cameras, and tablet computers are also developing towards ultra-miniaturization. With the improvement of ultra-miniaturization requirements, a head size of the camera module needs to be designed to be smaller.

Figure 1:
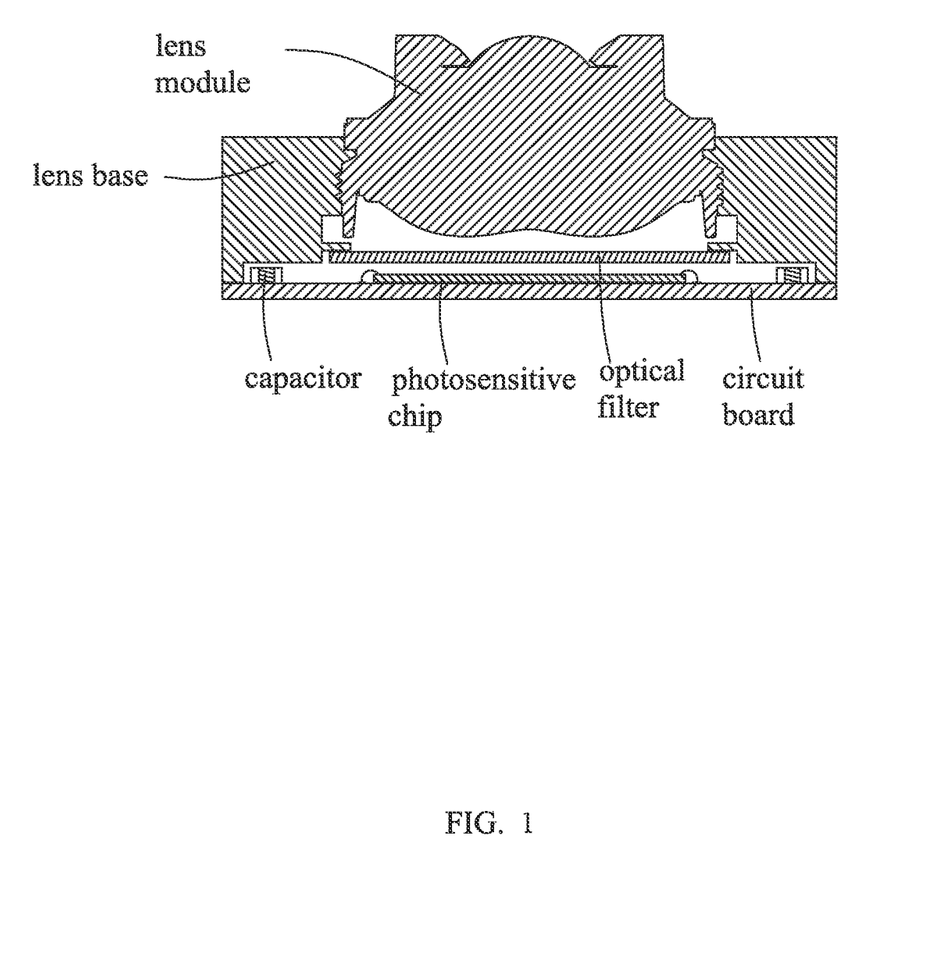
FIG. 1 is a schematic cross-sectional structural view of a camera module in the related technologies.

As shown in FIG. 1, a camera module in the related technologies includes a circuit board, a lens base supported and fixed on the periphery of the circuit board, a lens module mounted on the lens base, an optical filter supported and fixed on the lens base and spaced below the lens module in an optical axis direction of the lens module, a photosensitive chip (sensor) attached to the circuit board and facing and spaced apart from the optical filter, and at least one capacitor attached and fixed to the circuit board. The head size of the camera module is determined by a size of assembly of the lens module, the photosensitive chip, the circuit board (e.g., printed circuit board (PCB)), the optical filter (e.g., infrared (IR) optical filter), and the lens base (e.g., lens holder) or the like. The size of the lens module or the photosensitive chip is limited due to differences in different pixel levels, so the design size of the lens module and the photosensitive chip is hard to be optimized. Therefore, to achieve ultra-miniaturization of the camera module, the head size of the camera module needs to be reduced merely by changing the design size of the circuit board and the size of the lens base.

In the related technologies, a distance needs to be reserved between the capacitor of the camera module and an inner peripheral side of the lens base, such as 0.15 mm, to prevent the lens base from being interfered during assembling, which leads to the need to reservation of a corresponding space for the capacitor according to the layout of the capacitor on the circuit board when the lens base is designed. Therefore, during designing of an inner cavity of the lens base, there is a need to reserve a certain distance for the capacitor, and the inner cavity needs to wrap the capacitor, which finally leads to design of the redundant sizes when the size of the lens base meets the requirements of assembly of the lens module. In addition, since a lower surface of the lens base near the circuit board needs to be glued with the circuit board through glue during assembling of the lens base, it also leads to increase of an outward expansion size of the circuit board. Furthermore, the optical filter in related technologies needs to be mounted in a region of the lens base corresponding to the photosensitive chip, which may also increase the design size of the lens base to a certain extent. As a result, the design size of the camera module is too large to meet the ultra-miniaturization design requirements of the camera module.

Therefore, it is necessary to provide a new camera module to solve the above technical problems.

SUMMARY

The present disclosure aims to provide a new camera module to solve the problem that a design size of the camera module in the related technologies is too large to meet the ultra-miniaturization design requirements because there is a need to provide a space for avoiding capacitors and mounting optical filters in the camera module.

To solve the above technical problems, in a first aspect, the present disclosure provides a camera module. The camera module includes: a circuit board including a board body with a circuit design and at least one ring-shaped protruding portion that is protruded and extended from a part of a side of the board body; a photosensitive chip fixed on the board body and electrically connected with the board body, where the photosensitive chip is positioned inside each of the at least one protruding portion and spaced apart from each of the at least one protruding portion; an optical filter fixed on a side of each of the at least one protruding portion away from the board body, where the optical filter is spaced apart from and facing the photosensitive chip; at least one capacitor fixed on the side of the board body close to the optical filter and electrically connected with the board body, where each respective capacitor of the at least one capacitor is positioned outside a respective protruding portion and spaced apart from the respective protruding portion; a base defining a mounting space penetrating through the base, where a first adhesive layer is arranged on a periphery of the base close to the board body, the base is supported and fixed on a periphery of the board body through the first adhesive layer, and the at least one capacitor facing the base in a central axis direction of the base is covered by the first adhesive layer, and where the base is partially supported on the at least one capacitor covered by the first adhesive layer; and a lens mounted in the mounting space and spaced apart from a side of the optical filter away from the circuit board.

In some embodiments, the circuit board is a ceramic structural board and is formed using a ceramic board local hollowing process.

In some embodiments, the at least one protruding portion is configured as a plurality of protruding portions, and the plurality of protruding portions are spaced apart from one another and are collectively arranged in a shape of a ring.

In some embodiments, the respective protruding portion has a height in an optical axis direction of the lens larger than a height of the photosensitive chip in the optical axis direction of the lens and larger than a height of the respective capacitor in the optical axis direction of the lens.

In some embodiments, the photosensitive chip is bonded and fixed to the board body through a second adhesive layer.

In some embodiments, the photosensitive chip is electrically connected with the board body through a metal wire.

In some embodiments, the optical filter has a thickness of 0.21 mm in an optical axis direction of the lens.

In some embodiments, the base has a thickness in a range of 0.25 mm and 0.55 mm in an optical axis direction of the lens.

In a second aspect, embodiments of the disclosure provide an electronic device. The electronic device includes the camera module described above.

Compared with the related technologies, the camera module of the present embodiment includes the circuit board including the board body with the circuit design and the ring-shaped protruding portion that is protruded and extended from one side of the board body. The at least one capacitor is fixed to the board body and is located outside the protruding portion. The base is fixed on the periphery of the board body through the first adhesive layer, and the at least one capacitor directly facing the base is covered by the first adhesive layer. The base is partially supported on the at least one capacitor covered by the first adhesive layer. In addition, the optical filter is directly attached and fixed to the side of the protruding portion far away from the board body, so that there is a spacing between the base and the at least one capacitor without increase of additional design size of the camera module and the circuit board. In addition, the optical filter is attached and fixed on the circuit board, so that the design size of the base does not need to be additionally increased, thereby reducing the overall design size of the camera module and making the camera module meet the ultra-miniaturization design requirements.

BRIEF DESCRIPTION OF THE DRAWINGS

In order to more clearly explain the technical solutions in the embodiments of the present disclosure, the drawings required for use in the description of the embodiments will be briefly introduced below. It is obvious that the drawings described below are only some embodiments of the present disclosure, and other drawings can be obtained according to the drawings without any creative effort by those of ordinary skill in the art.

Reference numerals are illustrated as follows: 100, camera module; 1, circuit board; 11, board body; 12, protruding portion; 2, photosensitive chip; 21, second adhesive layer; 22, metal wire; 3, optical filter; 4, capacitor; 5, lens; 6, base; 61, first adhesive layer.

DETAILED DESCRIPTION OF THE EMBODIMENTS

The technical solutions in the embodiments of the present disclosure may be clearly and completely described in combination with the drawings in the embodiments of the present disclosure. Obviously, the described embodiments are merely some of the embodiments of the present disclosure, rather than all the embodiments. Based on the embodiments in the present disclosure, all other embodiments obtained by those skilled in the art without making creative work belong to the protection scope of the present disclosure.

Embodiments of the present disclosure provides a camera module 100. In combination with FIGS. 2 and 3, the camera module 100 includes a circuit board 1, a photosensitive chip 2, an optical filter 3, at least one capacitor 4, a lens 5, and a base 6.

Figure 2:
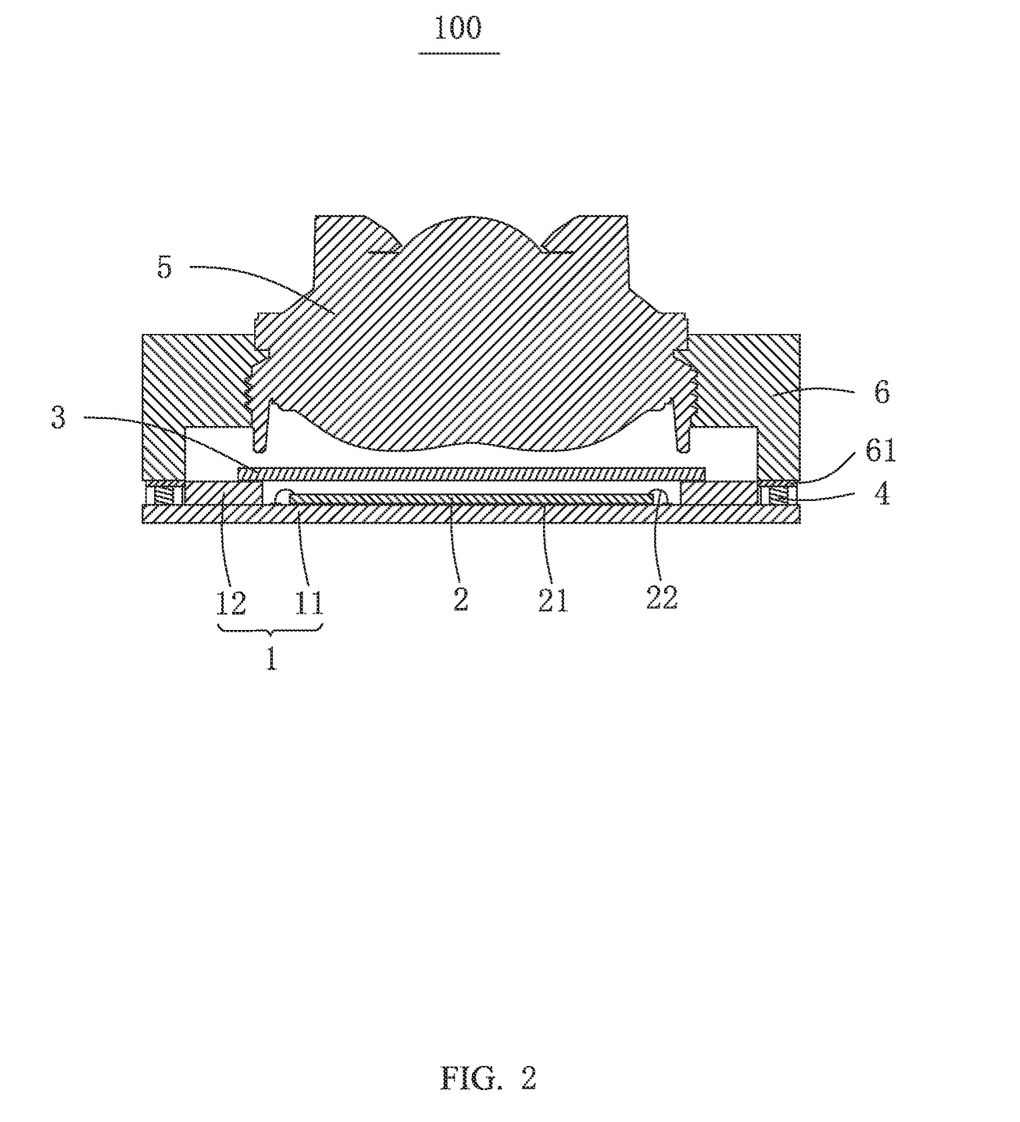
FIG. 2 is a schematic cross-sectional structural view of a camera module according to an embodiment of the present disclosure.
Figure 3:
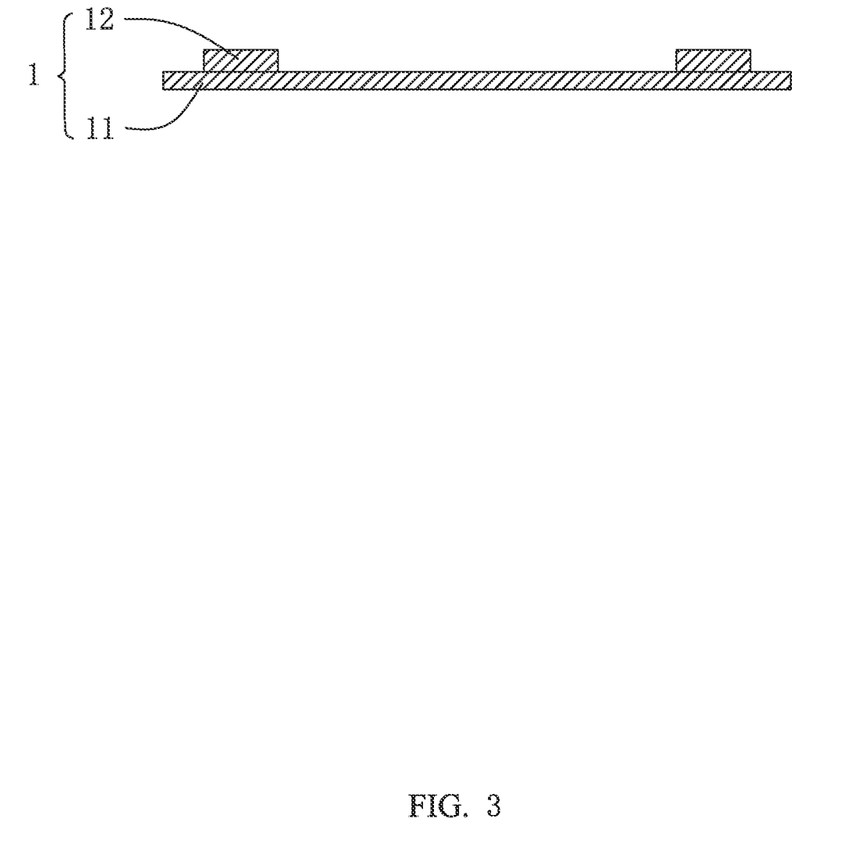
FIG. 3 is a schematic cross-sectional structural view of a circuit board in a camera module according to an embodiment of the present disclosure.

The circuit board 1 includes a board body 11 having a circuit design and a ring-shaped protruding portion(s) 12 that is protruded and extended from a part of a side of the board body 11. The photosensitive chip 2 is fixed to the board body 11 and electrically connected with the board body 11. The photosensitive chip 2 is positioned inside the protruding portion 12 and spaced apart from the protruding portion 12. The optical filter 3 is fixed on a side of the protruding portion 12 away from the board body 11, and the optical filter 3 is facing and spaced apart from the photosensitive chip 2. The at least one capacitor 4 is fixed on the side of the board body 11 close to the optical filter 3 and electrically connected with the board body 11. Each of the at least one capacitor 4 is located outside the protruding portion 12 and spaced apart from the protruding portion 12. The base 6 defines a mounting space (not shown) penetrating through the base 6, and a first adhesive layer 61 is provided on a periphery of the base 6 close to the board body 11. The base 6 is supported and fixed to the periphery of the board body 11 through the first adhesive layer 61. The at least one capacitor 4 facing the base 6 in a central axis direction of the base 6 is covered by the first adhesive layer 61. The base 6 is partially supported on the at least one capacitor 4 covered by the first adhesive layer 61. The lens 5 is mounted in the mounting space and spaced apart from a side of the optical filter 3 away from the circuit board 1.

No wire is required for the protruding portion 12, that is, merely the board body 11 of the circuit board 1 needs to be wired. The at least one capacitor 4 can be one or more capacitors 4, which is determined according to actual needs.

Since the base 6 is directly supported on the at least one capacitor 4, the first adhesive layer 61 can be thickened and filled in the region without the at least one capacitor 4. That is, there is no need to reserve an additional space for the at least one capacitor 4 in the base 6, and the circuit board 1 does not require an additional outward expansion size accordingly, thus reducing the overall design size of the camera module 100 and making the camera module 100 meet the ultra-miniaturization design requirements.

Specifically, the circuit board 1 is a ceramic structural board and is formed using a ceramic board local hollowing process.

There are a plurality of protruding portions 12. The plurality of protruding portions 12 are spaced apart from one another or equally spaced apart from one another and are collectively arranged in a shape of a ring.

In this embodiment, a height of the protruding portion 12 in an optical axis direction of the lens 5 is larger than a height of the photosensitive chip 2 in the optical axis direction of the lens 5 and larger than a height of a respective capacitor 4 of the at least one capacitor 4 in the optical axis direction of the lens 5. With such configuration, a sufficiently high mounting position can be provided for the optical filter 3 to prevent the optical filter 3 from touching a metal wire 21 for electrically connection between the photosensitive chip 2 and the circuit board 1 due to the optical filter 3 being too close to the photosensitive chip 2. Therefore, by controlling the height of the protruding portion 12 in the optical axis direction of the lens 5, it is possible to prevent the optical filter 3 from colliding with a bottom surface of the lens. In addition, such configuration allows the at least one capacitor 4 to be lower than the entire circuit board 1 to maintain a distance of each of the at least one capacitor 4 from the base 6.

That is, the height of the photosensitive chip 2 and the height of the respective capacitor 4 after the photosensitive chip 2 and the at least one capacitor 4 are welded with the board body 11 are both lower than the height of the protruding portion 12.

In embodiments of the disclosure, the photosensitive chip 2 is bonded and fixed to the board body 11 through a second adhesive layer 21 (double bond (DB) glue). The photosensitive chip 2 is electrically connected with the board body 11 through the metal wire 21.

In embodiments of the disclosure, a thickness of the optical filter 3 in the optical axis direction of the lens 5 is 0.21 mm. Specifically, a size of the optical filter 3 is determined according to a size of an area of the photosensitive chip 2, and a screen-printing size is determined according to a size of a photosensitive region of the photosensitive chip 2. The optical filter 3 can also be attached and fixed to the protruding portion 12 by glue.

In this embodiment, the base 6 has a thickness in a range of 0.25 mm to 0.55 mm in the optical axis direction of the lens 5.

Figure 4:
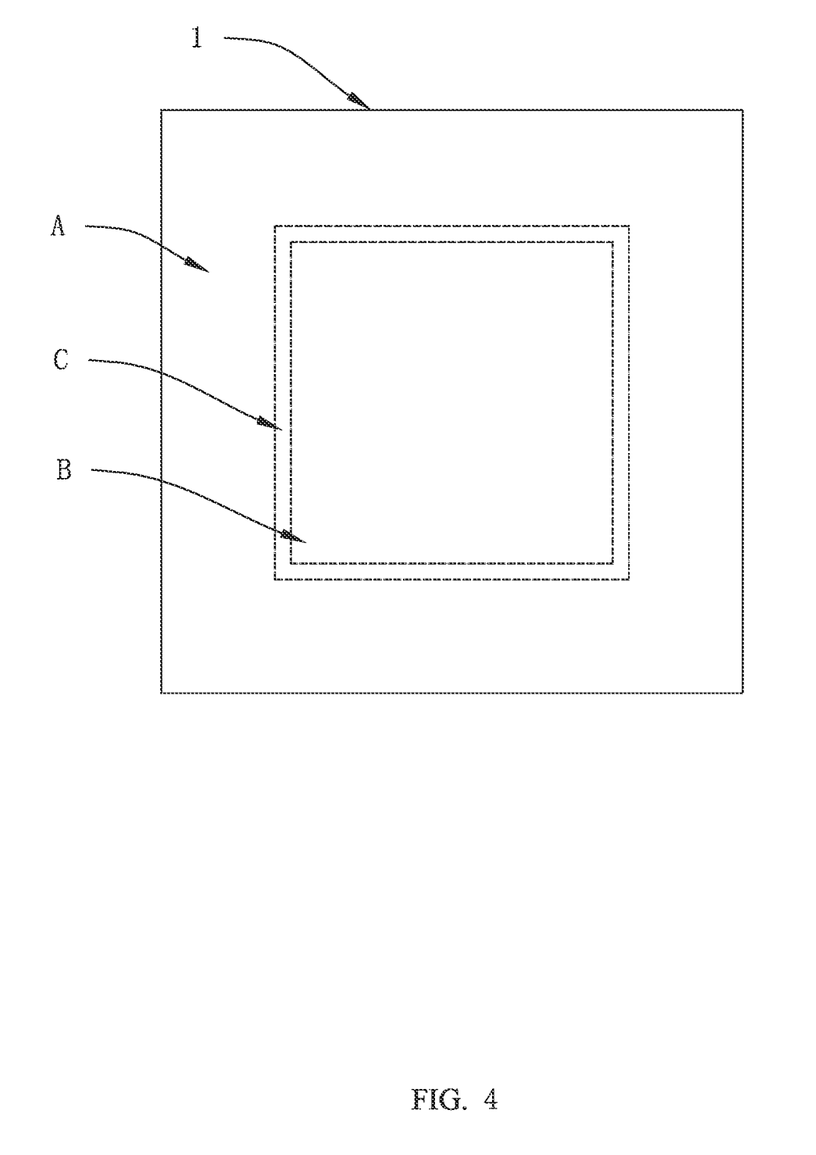
FIG. 4 is a schematic structural view of a layout region of a circuit board in a camera module according to an embodiment of the present disclosure.
Figure 5:
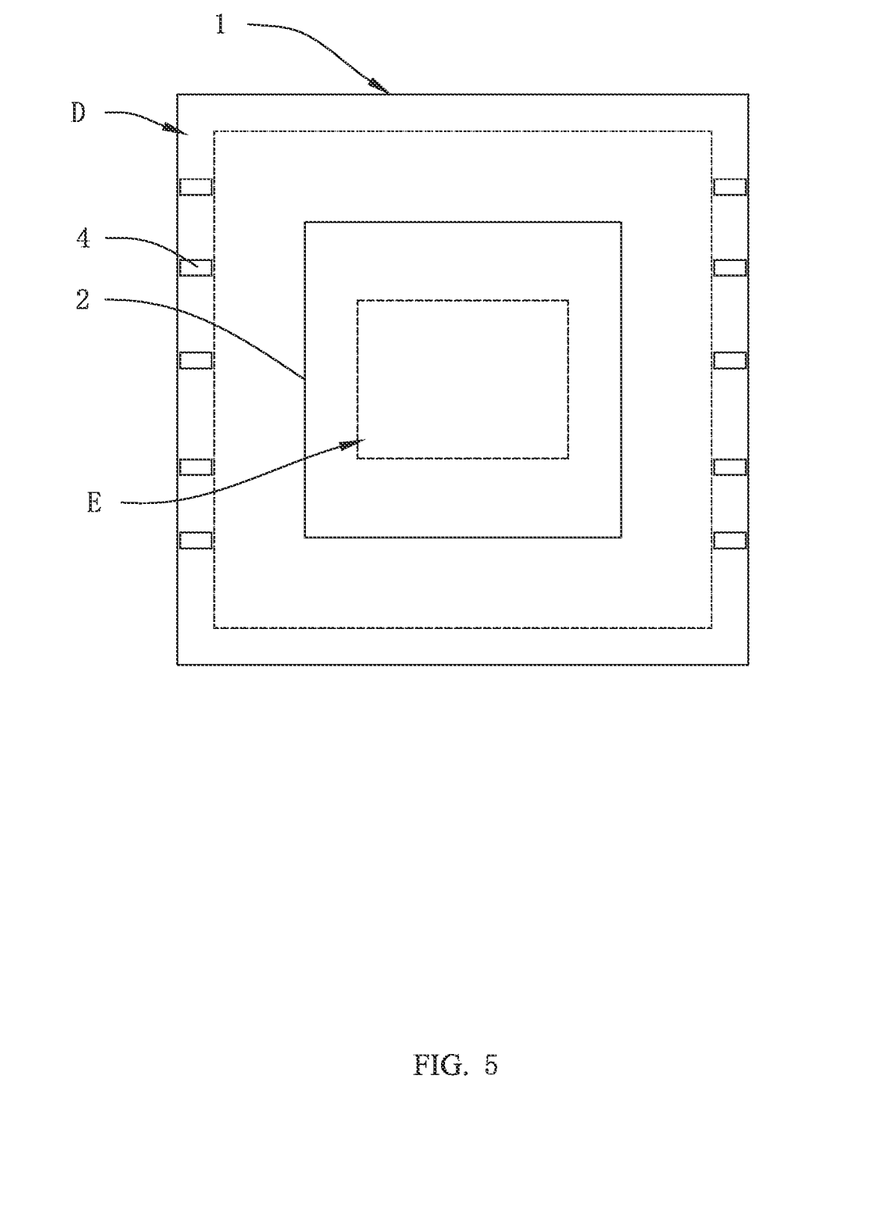
FIG. 5 is a schematic structural view of a circuit board and at least one capacitor in a camera module according to an embodiment of the present disclosure.
Figure 6:
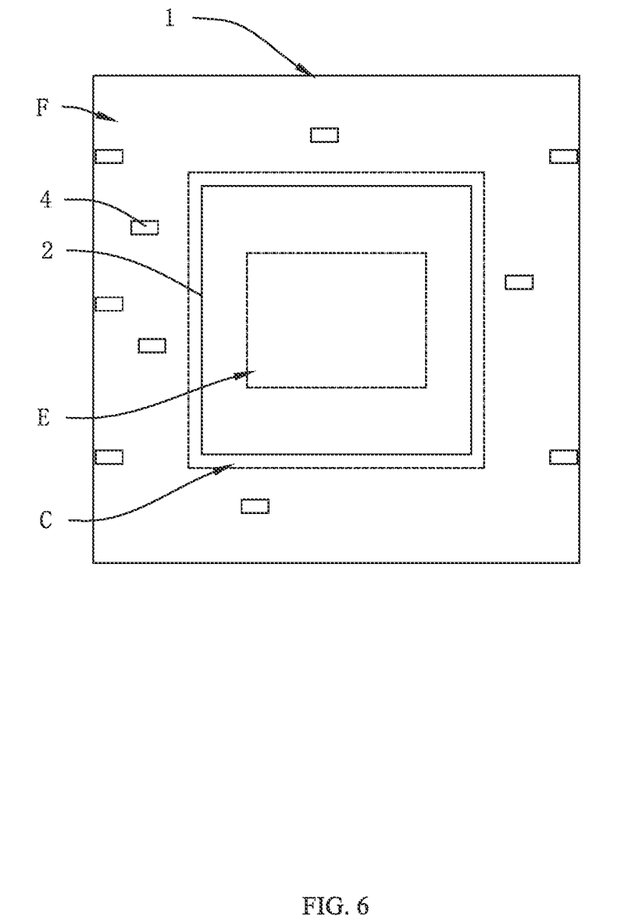
FIG. 6 is a schematic structural view of a layout region of a circuit board and at least one capacitor in a camera module according to an embodiment of the present disclosure.

FIG. 4 is a schematic structural view of a layout region of the circuit board 1 according to an embodiment of the present disclosure. In this embodiment, region A is a region for arranging the at least one capacitor 4, region B is used for mounting the photosensitive chip 2, and region C is used for mounting the optical filter 3. FIG. 5 is a schematic structural view of the circuit board 1 and the at least one capacitor 4 according to an embodiment of the present disclosure. In this embodiment, region D is an arrangement region of the first adhesive layer 61, and region E is a photosensitive region of the photosensitive chip 2. FIG. 6 is a schematic structural view of a layout region of the circuit board 1 and the at least one capacitor 4 according to an embodiment of the present disclosure. In this embodiment, region F is used for arranging the at least one capacitor 4.

Compared with the related technologies, the camera module 100 of the present embodiment includes the circuit board 1 including the board body 11 with the circuit design and the ring-shaped protruding portion 12 that is protruded and extended from the part of a side of the board body 11. The at least one capacitor 4 is fixed to the board body 11 and is located outside the protruding portion 12. The base 6 is fixed on the periphery of the board body 11 through the first adhesive layer 61, and the at least one capacitor 4 directly facing the base 6 is covered by the first adhesive layer 61. The base 6 is partially supported on the at least one capacitor 4 covered by the first adhesive layer 61. In addition, the optical filter 3 is directly attached and fixed to the side of the protruding portion 12 far away from the board body 11, so that there is a spacing between the base 6 and each of the at least one capacitor 4 without increase of additional design size of the camera module 100 and the circuit board 1 on the premise that the camera module 100 meets the optical design and pixel design. Furthermore, the optical filter 3 is attached and fixed on the circuit board 1, so that the design size of the base 6 does not need to be additionally increased, thereby reducing the overall design size of the camera module 100 and making the camera module 100 meet the ultra-miniaturization design requirements.

Embodiments of the present disclosure further provide an electronic device, and the electronic device includes the camera module 100 in the embodiment. Since the electronic device in this embodiment includes the camera module 100 in the above-mentioned embodiment, the electronic device can also achieve the technical effect achieved by the camera module 100 in the above-mentioned embodiment, which are not described here.

The above-mentioned embodiments are only some embodiments of the present disclosure, and it is to be pointed out that for those skilled in the art, improvements can be made on the premise of not departing from the creative conception of the present disclosure, but all these belong to the protection scope of the present disclosure.

What is claimed is:

1. A camera module, comprising:
    a circuit board comprising a board body with a circuit design and at least one ring-shaped protruding portion that is protruded and extended from a part of a side of the board body;
    a photosensitive chip fixed on the board body and electrically connected with the board body, wherein the photosensitive chip is positioned inside each of the at least one protruding portion and spaced apart from each of the at least one protruding portion;
    an optical filter fixed on a side of each of the at least one protruding portion away from the board body, wherein the optical filter is spaced apart from and facing the photosensitive chip;
    at least one capacitor fixed on the side of the board body close to the optical filter and electrically connected with the board body, wherein each respective capacitor of the at least one capacitor is positioned outside a respective protruding portion of the at least one protruding portion and spaced apart from the respective protruding portion;
    a base defining a mounting space penetrating through the base, wherein a first adhesive layer is arranged on a periphery of the base close to the board body, the base is supported and fixed on a periphery of the board body through the first adhesive layer, and the at least one capacitor facing the base in a central axis direction of the base is covered by the first adhesive layer, and wherein the base is partially supported on the at least one capacitor covered by the first adhesive layer; and
    a lens mounted in the mounting space and spaced apart from a side of the optical filter away from the circuit board.

2. The camera module of claim 1, wherein the circuit board is a ceramic structural board and is formed using a ceramic board local hollowing process.

3. The camera module of claim 2, wherein the at least one protruding portion is configured as a plurality of protruding portions, and the plurality of protruding portions are spaced apart from one another and are collectively arranged in a shape of a ring.

4. The camera module of claim 1, wherein the respective protruding portion has a height in an optical axis direction of the lens larger than a height of the photosensitive chip in the optical axis direction of the lens and larger than a height of the respective capacitor in the optical axis direction of the lens.

5. The camera module of claim 1, wherein the photosensitive chip is bonded and fixed to the board body through a second adhesive layer.

6. The camera module of claim 1, wherein the photosensitive chip is electrically connected with the board body through a metal wire.

7. The camera module of claim 1, wherein the optical filter has a thickness of 0.21 mm in an optical axis direction of the lens.

8. The camera module of claim 1, wherein the base has a thickness in a range of 0.25 mm and 0.55 mm in an optical axis direction of the lens.

9. An electronic device, comprising a camera module, wherein the camera module comprises:
- a circuit board comprising a board body with a circuit design and at least one ring-shaped protruding portion that is protruded and extended from a part of a side of the board body;
- a photosensitive chip fixed on the board body and electrically connected with the board body, wherein the photosensitive chip is positioned inside each of the at least one protruding portion and spaced apart from each of the at least one protruding portion;
- an optical filter fixed on a side of each of the at least one protruding portion away from the board body, wherein the optical filter is spaced apart from and facing the photosensitive chip;
- at least one capacitor fixed on the side of the board body close to the optical filter and electrically connected with the board body, wherein each respective capacitor of the at least one capacitor is positioned outside a respective protruding portion of the at least one protruding portion and spaced apart from the respective protruding portion;
- a base defining a mounting space penetrating through the base, wherein a first adhesive layer is arranged on a periphery of the base close to the board body, the base is supported and fixed on a periphery of the board body through the first adhesive layer, and the at least one capacitor facing the base in a central axis direction of the base is covered by the first adhesive layer, and wherein the base is partially supported on the at least one capacitor covered by the first adhesive layer; and
- a lens mounted in the mounting space and spaced apart from a side of the optical filter away from the circuit board.

10. The electronic device of claim 9, wherein the circuit board is a ceramic structural board and is formed using a ceramic board local hollowing process.

11. The electronic device of claim 10, wherein the at least one protruding portion is configured as a plurality of protruding portions, and the plurality of protruding portions are spaced apart from one another and are collectively arranged in a shape of a ring.

12. The electronic device of claim 9, wherein the respective protruding portion has a height in an optical axis direction of the lens larger than a height of the photosensitive chip in the optical axis direction of the lens and larger than a height of the respective capacitor in the optical axis direction of the lens.

13. The electronic device of claim 9, wherein the photosensitive chip is bonded and fixed to the board body through a second adhesive layer.

14. The electronic device of claim 9, wherein the photosensitive chip is electrically connected with the board body through a metal wire.

15. The electronic device of claim 9, wherein the optical filter has a thickness of 0.21 mm in an optical axis direction of the lens.

16. The electronic device of claim 9, wherein the base has a thickness in a range of 0.25 mm and 0.55 mm in an optical axis direction of the lens.

* * * * *